(12) United States Patent
Felder

(10) Patent No.: US 6,724,888 B2
(45) Date of Patent: Apr. 20, 2004

(54) CALL TRANSMITTER FOR THE INPUT OF CONTROL COMMANDS, PARTICULARLY FOR AN ELEVATOR INSTALLATION

(75) Inventor: Hugo Felder, Buchrain (CH)

(73) Assignee: Inventio AG, Hergiswil (CH)

( * ) Notice: Subject to any disclaimer, the term of this patent is extended or adjusted under 35 U.S.C. 154(b) by 484 days.

(21) Appl. No.: 09/885,680

(22) Filed: Jun. 20, 2001

(65) Prior Publication Data

US 2001/0055383 A1 Dec. 27, 2001

(30) Foreign Application Priority Data

Jun. 26, 2000 (EP) .............................................. 00810562

(51) Int. Cl.$^7$ ............................. H04M 1/00; H01H 9/00
(52) U.S. Cl. ........................................ 379/368; 200/314
(58) Field of Search ............................. 379/368, 433.06, 379/433.07; 200/314, 310, 313, 341

(56) References Cited

U.S. PATENT DOCUMENTS 4,742,198 A    5/1988    Martin et al. ................ 200/296
5,391,848 A  * 2/1995    Murphy ....................... 200/314

FOREIGN PATENT DOCUMENTS

| DE | 551 898 | 6/1932 | |
| EP | 0 567 357 | 10/1993 | .......... H01H/13/02 |
| GB | 773 341 | 4/1957 | |

\* cited by examiner

Primary Examiner—Jack Chiang
(74) Attorney, Agent, or Firm—MacMillan, Sobanski & Todd, LLC

(57) ABSTRACT

A call transmitter for the input of control commands, in particular for an elevator installation, has at least one carrier element that can be selectively received in an opening in either end face of a call transmitter housing. The housing has an inner positioning element preventing movement of the carrier element between the openings. The housing can be installed in an aperture in a front plate such that either the first end face and the carrier element are flush with the outer surface of the front plate, or a radially outwardly extending flange at the second end face abuts the outer surface with the flange and the carrier element projecting.

14 Claims, 4 Drawing Sheets

CALL TRANSMITTER FOR THE INPUT OF CONTROL COMMANDS, PARTICULARLY FOR AN ELEVATOR INSTALLATION

BACKGROUND OF THE INVENTION

The present invention relates to a call transmitter for the input of control commands to system controller, particularly for an elevator installation.

Conventional call transmitters for elevator systems, shown, for example, in the U.S. Pat. No. 4,742,198 and EP 567 357, are constructed in such a manner that the call transmitter housing can be installed only in a predetermined position. According to the above-mentioned specifications, the installation is either projecting from or flush with a front plate of a panel. It is a disadvantage of the known call transmitters that different call transmitter housings have to be used for each possible form of the call transmitter, i.e. one call transmitter housing per call transmitter. This has the consequence that call transmitter housings and the individual elements of the call transmitter can be used only with limitations, i.e. in each instance only for a specific case of use. The number of different elements to be produced is large. Moreover, the call transmitters which, in particular, are installed to be flush can mostly be used only for a pre-defined maximum front plate thickness (typically 2 to 4 millimeters).

SUMMARY OF THE INVENTION

The present invention has the object of providing a call transmitter, for the input of control commands, of the kind described above, that does not have the aforesaid disadvantages and such that at least two embodiments or variants of installation of the call transmitter are possible with a single, identical call transmitter housing. The number of elements to be produced is small and a large inventory is no longer necessary for the provision thereof.

The special construction, which is symmetrical at the inner side, of the call transmitter housing is advantageous, as it enables a flexible installation and use of identical components for both variants.

Of further advantage is the fact that with this construction of the call transmitter housing not only a flush, but also a projecting installation is possible.

A further advantage is that the two embodiments or variants of installation of the call transmitter according to the present invention can be installed even with thicker front plates. The call transmitter housing can be installed steplessly into front plates of different thickness up to a defined maximum front plate thickness.

In addition, both variants of installation—flush and projecting—can be mounted in an identical installation cutout of the front plate.

The positioning element of the call transmitter housing also serves as a boundary surface for the carrier element and for the electronic unit.

In commercially available call transmitters, the symbols, numerals and Braille marking are usually formed or cast in synthetic material so as to be elevated. The formed variants usually have undesirable roundings of the symbols, numerals or Braille marking and, in addition, the formed numerals, for all intents and purposes, cannot be permanency characterized by a color strong in contrast. The cast synthetic material variants are often used at the same time as a call acknowledgment device (lighted from behind) and undesirable visible connecting webs are present in complicated numerals (for example, 0, 4, 6, 8, and 9). Moreover, the synthetic material numerals are susceptible to vandalism, particularly to damage by means of cigarette lighters and knives.

The call transmitter according to the invention has the symbols, numerals and Braille markings projecting from the carrier plate and produced from a metallic material, which enables a different, permanent coloration and at the same time is resistant to vandalism (cigarette lighters, knives, etc.).

All explained features are usable not only in the respectively stated combination, but also in other combinations or by themselves without departing from the scope of the invention.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
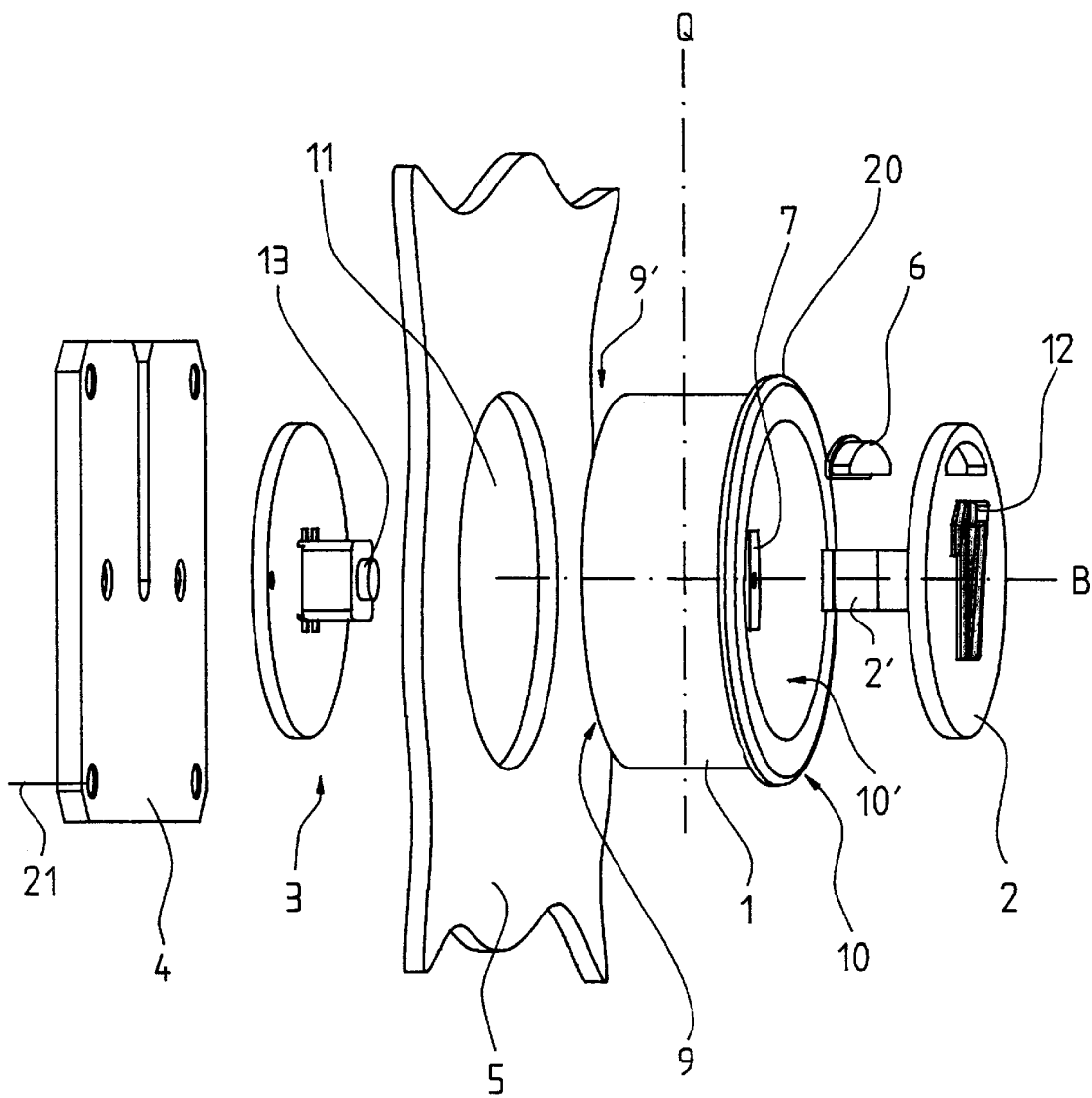
FIG. 1 is an exploded perspective view of a call transmitter according to a first embodiment of the present invention.

In FIG. 1 there is illustrated a first embodiment of a call transmitter according to the present invention in an unmounted state for a projecting installation. This call transmitter for the input of control commands includes of a housing 1, termed a call transmitter housing in the following description, a carrier element constructed as, for example, a carrier plate 2, an electronic unit 3 and a retaining element constructed as, for example, a retaining plate 4.

The call transmitter housing 1 has a generally tubular shape in longitudinal direction defined by an axis of actuation B and transversely thereto a transverse axis Q. The call transmitter is installed in a front plate 5 being received and mounted in an installation cutout 11 and extending through the plate from an outer surface of the plate. The electronic unit 3 includes contacts 13, the actuation of which is effected by pressure on the carrier plate 2 to move it toward the electronic unit. Actuation of the contacts 13 generates a command signal that can be sent to a control system (not shown) such as an elevator control. In an elevator installation, the front plate 5 can be mounted in an elevator car or on a wall adjacent an elevator hallway door. The carrier plate 2 can be selectively equipped with or be without an acknowledgment element 6. Symbols, numerals and/or a Braille marking 12 is or are placed on an outwardly facing surface of the carrier plate 2.

The carrier plate 2 can be of integral or, multi-part construction. Moreover, only parts thereof can be movable and/or be actuated. Also, several carrier elements 2 can be installed in a single call transmitter housing 1.

A positioning element 7 for positioning the carrier plate 2 is present in the call transmitter housing 1. The call transmitter housing 1 has a first inwardly facing end 9 and an opposite, second outwardly facing end 10, also called in the following a first end face 9 and a second end face 10, respectively, of the call transmitter housing 1. The first end face 9 has a first opening 9' formed therein and the second end face 10 has a second opening 10' formed therein, which openings are aligned with one another along the axis of actuation B. The positioning element 7 is so arranged in the interior of the call transmitter housing 1 that it is disposed in the middle between the first opening 9' and the second opening 10' or between the first end face 9 and the second end face 10. The first end face 9 and the second end face 10 are thus arranged symmetrically with respect to the positioning element 7. This circumstance enables installation of the carrier plate 2 from both end faces 9 and 10, wherein the carrier plate 2 is always flush with the first end face 9 or with the second end face 10. The call transmitter housing 1 is constructed to be substantially symmetrical in the direction of the axis of actuation B with respect to the positioning element 7.

The positioning element 7 is in this form of embodiment substantially inwardly projecting tongues/projections 7', at which corresponding fastening/locking means 2' of the carrier plate 2 can engage or detent. Other forms of the positioning element 7 or of the carrier element 2 are also possible, such as, for example, slots with corresponding engagement means. The positioning element can also be constructed as an encircling edge within the call transmitter housing 1 or as an apertured plate.

The call transmitter housing 1 is formed in such a manner that the first end face 9 corresponds exactly with the call transmitter shape and the opposite, second end face 10 has a protruding flange 20 or a shoulder.

Figure 3:
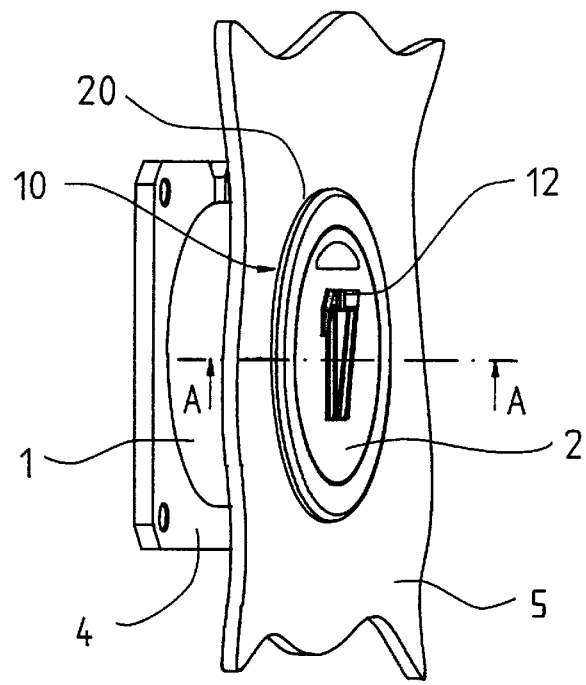
FIG. 3 is a perspective view of the call transmitter shown in FIG. 1 mounted to extend from the front plate.
Figure 5:
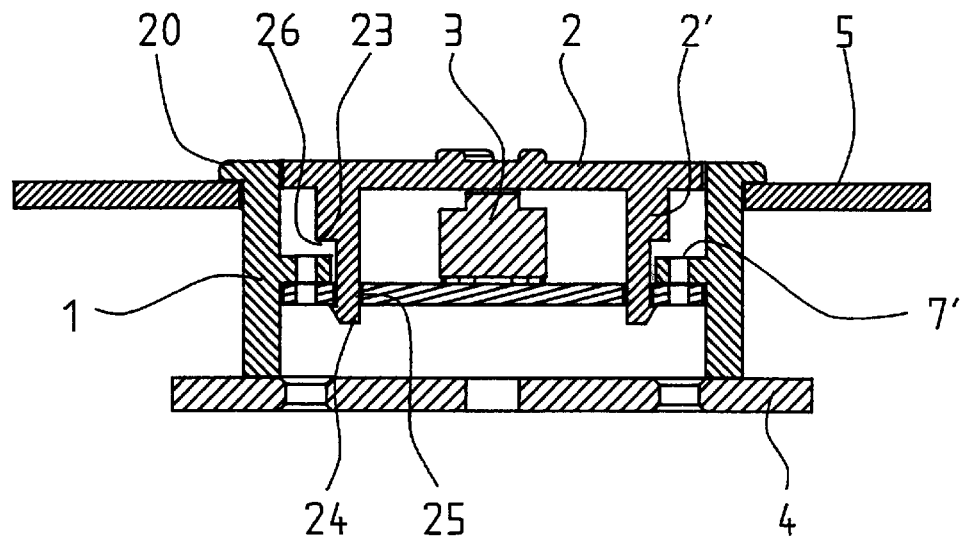
FIG. 5 is a cross-sectional view taken along the line A—A in FIG. 3.

In the projecting installation variant, the call transmitter projects beyond the outer surface of the front plate 5 by the flange thickness as shown in FIG. 3 and FIG. 5. The projecting flange 20 at the second end face 10 functions as an abutment relative to the front plate 5. The carrier plate 2, which serves as an operating surface for input of control commands, is in this variant installed in the second end face 10 provided with the flange 20. On actuation of the call transmitter by pressure on the carrier plate 2, accordingly there is no risk that the call transmitter drops out the back, i.e. in the direction of the pressure. The call transmitter, if it is to be mounted projecting, can be clamped with the front plate 5, for example by fasteners such as screws 21 (shown schematically) extending through apertures in the retaining plate 4 which is fastened to the call transmitter housing 1 for the electronic unit 3.

According to the present invention this special construction of the call transmitter housing 1 enables installation of the call transmitter in the front plate 5 not only to be projecting, as described above, but also to be flush with the front plate 5. In order to realize the flush variant of installation, it is sufficient to rotate the call transmitter housing 1 from the orientation shown in FIG. 1 through one hundred eighty degrees about the transverse axis Q; i.e. swap end for end. The above-described symmetry of the call transmitter housing 1 with respect to the positioning element 7 allows the call transmitter components of the projecting variant of installation to also be used for the flush variant of installation.

Figure 2:
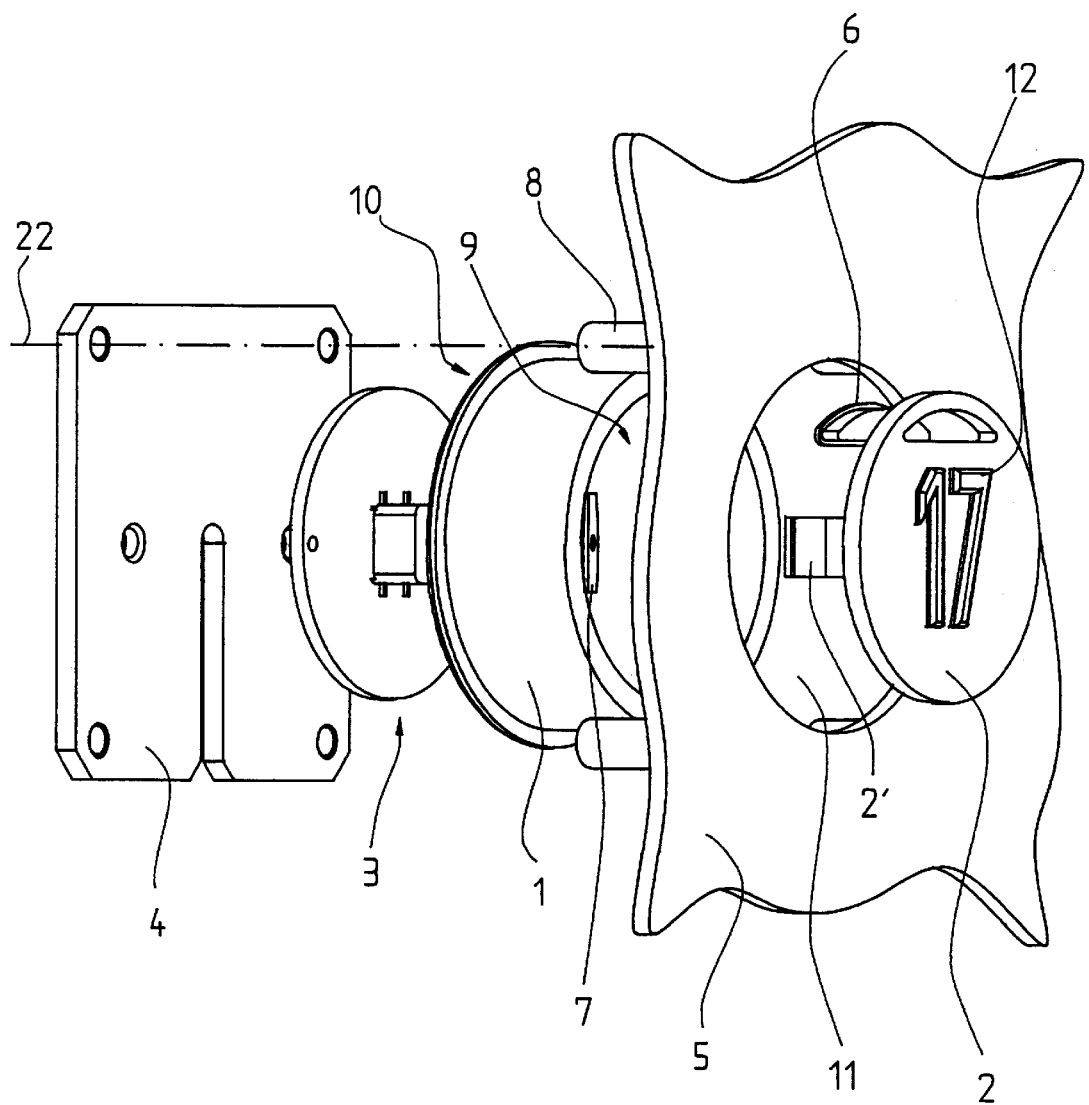
FIG. 2 is an exploded perspective view of a call transmitter according to a second embodiment the present invention.

FIG. 2 shows an exploded illustration of the call transmitter in the flush variant of installation, wherein the same elements are denoted by the same reference characters as in FIG. 1.

The carrier plate 2 serving as operating surface for the input of control commands is in this variant installed in the first end face 9 not provided with the flange 20. By virtue of the symmetrical construction of the call transmitter housing 1 the fastening/locking means 2' of the carrier plate 2 are engaged/detented at inwardly protruding tongues/projections 7' of the positioning element 7 also in this variant.

On actuation of the call transmitter by pressure on the carrier 2 there then exists, however, the risk that the call transmitter drops out at the back, i.e. in the direction of the pressure, since an abutment against the front plate 5 is no longer present. For this reason additional fastening elements are of advantage for the fastening of the call transmitter at the front plate 5 in the flush variant of installation. These fastening elements preferably consist substantially of two spacers 8 that can be fastened to the rear surface of the front plate 5 and to the retaining plate 4. In one form of embodiment the spacers 8 are constructed as weld pins, which are fastened to the front plate 5. The retaining plate 4 is fastened with the aid of screws 22 (shown schematically) and the weld pins.

Obviously the spacers 8 can also be fastened to the retaining plate 4 and then be mounted on the front plate 5 with the aid of fastening means.

This fastening mechanism enables fastening of the call transmitter even in the case of greater front plate thicknesses. The maximum front plate thickness is in that case determined by the selected length of the call transmitter housing. The minimum length of the call transmitter housing 1 corresponds with the maximum defined front plate thickness, plus flange thickness. With this construction the call transmitter can be steplessly installed in different front plate thicknesses up to a defined front plate thickness. The call transmitter can preferably be installed in front plate thicknesses between one and twelve millimeters. Thicker front plates are also possible.

The installation cutout 11 in the front plate 5 is identical in the flush installation variant and the projecting installation variant. Due to the symmetrical construction of the components, thus identical components for both variants of installation of flush and projecting, and the circumstance that identical installation cutouts 11 are used for both variants of installation, the flush installation variant can in case of need also be converted on site into the projecting installation variant. The same components such as call transmitter housing 1, carrier plate 2, electronic unit 3, retaining plate 4, acknowledgment element 6 and symbols, numerals and Braille marking 12 can be used for both variants of installation.

The call transmitter housing 1 itself can be installed in two different variants in the front plate 5, on the one hand that the first end face 9 of the call transmitter housing 1 is flush with the front plate 5 and on the other hand that the second end face 10 of the call transmitter housing 1 is mountable to project from the front plate 5 by the distance of the flange 20.

Figure 4:
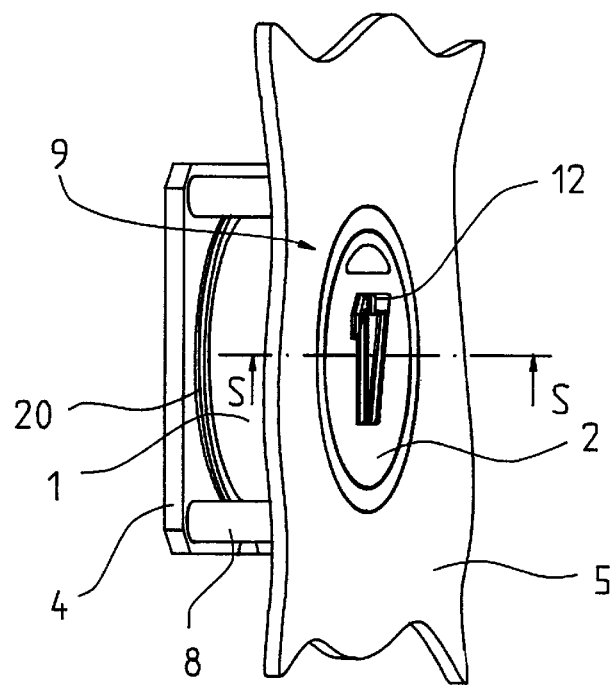
FIG. 4 is a perspective view of the call transmitter shown in FIG. 2 mounted to be flush with the front plate.

The call transmitter is illustrated in FIG. 3 in the state of being mounted to project and the call transmitter is illustrated in FIG. 4 in the state of being mounted to be flush. The carrier plate 2 with the symbols 12 and the electronic unit 3 are received by the call transmitter housing 1, wherein in FIG. 4 the call transmitter housing 1 has been rotated through one hundred eighty degrees about the transverse axis Q from the position shown in FIG. 3 and additional spacers 8 for the fastening of the retaining plate 4 to the front plate 5 have been used. Otherwise, all the elements of FIGS. 3 and 4 are the same. In the FIG. 3 variant, the carrier plate 2 is installed from the second end face 10 provided with the flange 20, whereas in the FIG. 4 variant the carrier plate 2 is installed from the unflanged first end face 9.

FIG. 5 shows a sectional view of the call transmitter mounted to project. This figure serves for a more clear schematic illustration of the individual call transmitter components in the mounted state. The call transmitter housing 1 has in its inner circumference, as the positioning element 7, two tongues 7' which cooperate with corresponding engagement means 2' of the carrier plate 2. The tongues 7' serve at the inner side as a boundary surface of the electronic unit 3 and at the outer side, i.e. from the side of the carrier plate 2, as a boundary surface for the engagement means 2' of the carrier plate 2, which in turn has an abutment surface 23 for that purpose. In this form of embodiment the engagement means 2' have noses 24 which detent in slots 25 of the support plate of the electronic unit 3. The support plate 3 is constructed in this form of embodiment as a circuit board. In this manner the tongues 7' represent a boundary surface relative to the inside for the carrier plate 2 and relative to the outside for the electronic unit 3. The carrier plate 2 can be displaced inwardly only up to the positioning element 7, thus the electronic unit 3 cannot be pressed out of the call transmitter housing 1. In the non-actuated state, i.e. when the carrier plate is not pressed, as shown in FIG. 5, there exists between the abutment surface 23 and the tongues 7' a certain clearance or stroke 26, which usually has to be present for correct actuation of the carrier plate 2. This means that if the carrier plate 2 is pressed, it is to be displaced somewhat inwardly so that the electronic unit 3 can perform its function. At the same time in an unoperated state the carrier plate 2 is brought into its initial position, i.e. flush with the call transmitter housing 1, solely by the electronic unit 3. In similar manner this resetting could also be achieved by a spring.

On actuation of the carrier plate 2 the force absorption is thus taken up not completely by way of the electronic unit 3, but also by way of the positioning element 7. Although the positioning element 7 is illustrated as the projections 7', it can take other shapes such as an annular flange or a plate having a central aperture to perform the same functions.

Figure 6:
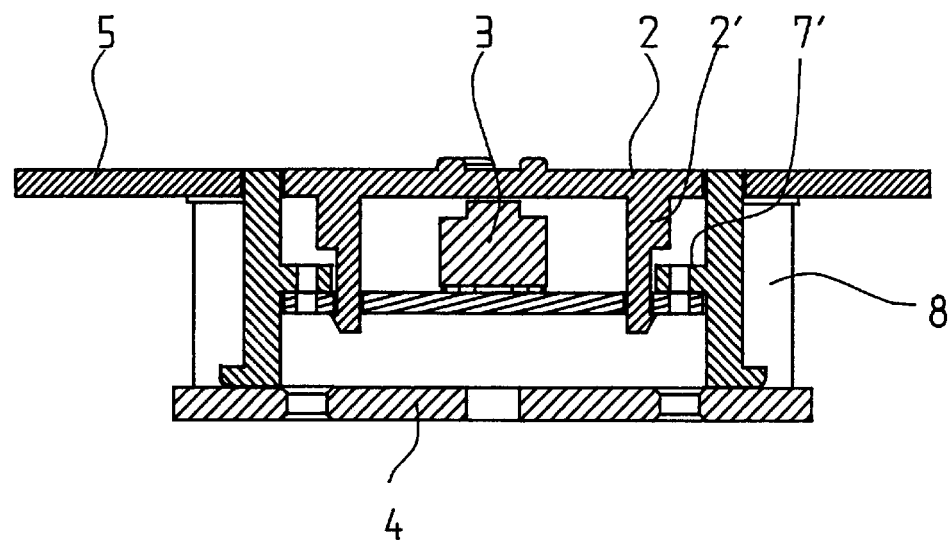
FIG. 6 is a cross-sectional view taken along the line S—S in FIG. 4.

FIG. 6 is a sectional view of the call transmitter mounted to be flush, wherein the call transmitter has the same elements as in FIG. 5 with inclusion of the spacers 8.

Due to the separate components of the carrier plate 2, the symbols, numerals or Braille 12 and the call transmitter housing 1, various design aspects and different color combinations can also be realized in simple manner without problems. The different possibilities of coloration of carrier plate, call transmitter housing, front plate and numerals allow wide freedom in the fulfillment of standards.

The symbols, numerals and Braille markings project from the outer surface of the carrier plate and are produced from a metallic material, which enables a different, permanent coloration and at the same is resistant to vandalism (cigarette lighters, knives, etc.).

The call transmitter housing according to the present invention can have different shapes. It can be, for example, a hollow cylinder, a hollow tube or block-shaped. It can be made of steel, but other materials, such as, for example, plastics material, diecast zinc, aluminum and so forth, are also conceivable.

The call transmitter according to the invention finds use particularly for call inputs in elevator installations.

The same construction can also be used for call input by means of key-operated switches (key-operated switch elements), for illuminated reference functions (lamp elements, indicators), for command input by means of rocker switches (rocker switch elements), for acoustic information functions (buzzer elements, conversation elements) or for addressed reference functions (address elements).

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A call transmitter for inputting control commands to a control system comprising:
    a generally tubular housing having opposed first and second end faces, said first and second end faces having first and second openings formed therein respectively, said first and second openings being aligned along an actuation axis, and a flange radially extending from said housing at said second end face; and
    at least one carrier element selectively receivable in said first and second openings whereby when said housing is mounted in an aperture formed in a front plate with said flange abutting an outer surface of the face plate, said at least one carrier element is received in said second opening to project outwardly from the outer surface, and when said housing is mounted in the aperture formed in the front plate with said first end substantially flush with the outer surface of the face plate, said at least one carrier element is received in said first opening substantially flush with the outer surface.

2. The call transmitter according to claim 1 including a positioning element attached inside said housing for preventing travel of said carrier element between said first opening and said second opening.

3. The call transmitter according to claim 2 wherein said positioning element is attached midway between said first and second end faces in a direction of said axis of actuation.

4. The call transmitter according to claim 2 wherein said positioning element includes at least two radially inwardly extending projections.

5. The call transmitter according claim 1 wherein said housing has a length from said first end face to said flange sufficient to extend through the front plate having a thickness in a range of 1 mm to 12 mm.

6. The call transmitter according to claim 1 including at least one character formed of a metallic material attached to and extending from a surface of said carrier element.

7. The call transmitter according to claim 1 including an electronic unit mounted in said housing and being actuatable by movement of said carrier element along said axis of actuation to generate a control command signal.

8. A call transmitter for inputting control commands to an elevator control system comprising:
    an elevator installation face plate having an outer surface and an aperture formed therethrough;
    a generally tubular housing having opposed first and second end faces, said first and second end faces having first and second openings formed therein respectively, said first and second openings being aligned along an actuation axis, and a flange radially extending from said housing at said second end face; and at least one carrier element selectively receivable in said first and second openings whereby when said housing is mounted in said aperture with said flange abutting said outer surface of the face plate, said at least one carrier element is received in said second opening to project outwardly from said outer surface, and when said housing is mounted in said aperture with said first end substantially flush with said outer surface, said at least one carrier element is received in said first opening substantially flush with said outer surface.

9. The call transmitter according to claim 8 including a positioning element attached inside said housing midway between said first and second end faces in a direction of said axis of actuation for preventing travel of said carrier element between said first opening and said second opening.

10. The call transmitter according to claim 9 including an electronic unit mounted in said housing and being actuatable by movement of said carrier element along said axis of actuation to generate an elevator control command signal, said carrier element and said electronic unit being positioned on opposite sides of said positioning element.

11. The call transmitter according to claim 8 including an electronic unit mounted in said housing and being actuatable by movement of said carrier element along said axis of actuation to generate a control command signal.

12. The call transmitter according to claim 8 including at least one character attached to and extending from a surface of said carrier element.

13. The call transmitter according to claim 12 wherein said at least one character is formed of a metal material.

14. The call transmitter according to claim 8 including an acknowledgement element positioned in said housing adjacent to said carrier element.

* * * * *